INVENTOR.
HOLLIS H. BASCOM
JOHN J. GRECI
RICHARD G. JENKINS
BY
Fryer + Tjensvold
ATTORNEYS Feb. 17, 1970   H. H. BASCOM ET AL   3,496,053
LAMINATED NONWOVEN STRAND REINFORCED SHEET
Original Filed May 6, 1964   5 Sheets-Sheet 2

INVENTOR.
HOLLIS H. BASCOM
JOHN J. GRECI
BY  RICHARD G. JENKINS

ATTORNEYS

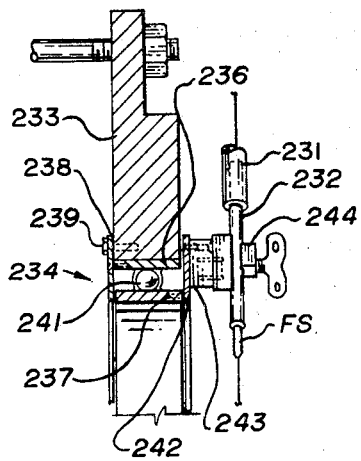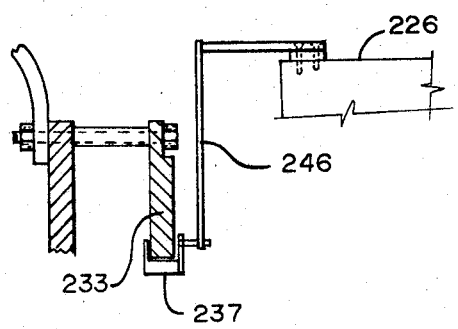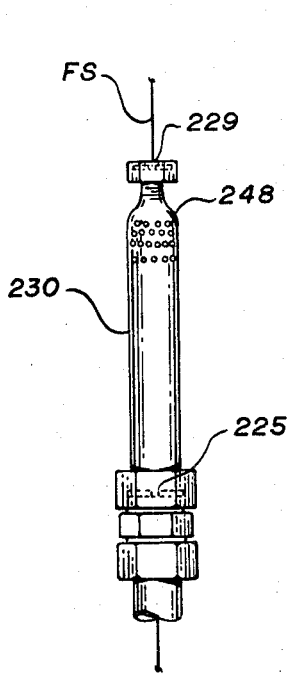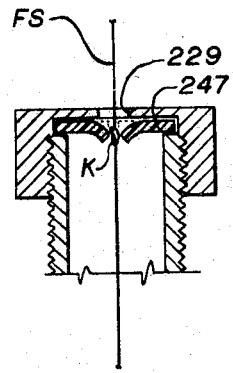

INVENTOR.
HOLLIS H. BASCOM
JOHN J. GRECI
RICHARD G. JENKINS
BY

ATTORNEYS

Feb. 17, 1970 H. H. BASCOM ET AL 3,496,053
LAMINATED NONWOVEN STRAND REINFORCED SHEET
Original Filed May 6, 1964 5 Sheets-Sheet 5

INVENTOR.
HOLLIS H. BASCOM
JOHN J. GRECI
BY   RICHARD G. JENKINS

ATTORNEYS

United States Patent Office 3,496,053
Patented Feb. 17, 1970

3,496,053
LAMINATED NONWOVEN STRAND REINFORCED SHEET
Hollis H. Bascom and John J. Greci, Livermore, and Richard G. Jenkins, Fremont, Calif., assignor to Orcon Corporation, Livermore, Calif., a corporation of California
Original application May 6, 1964, Ser. No. 365,318, now Patent No. 3,391,039, dated July 2, 1968. Divided and this application Jan. 29, 1968, Ser. No. 712,316
Int. Cl. B32b 5/12
U.S. Cl. 161—57                     3 Claims

ABSTRACT OF THE DISCLOSURE

A continuously formed sheet product includes strand reinforcement. The product is made by a machine in strip form and has an indeterminate length in the warp direction of movement through the machine. Strand reinforcement is produced by a plurality of precisely oriented parallel fill strands extending across the strip of sheet material in a direction perpendicular to the warp direction. A thin film of adhesive extends on the innerside of each fill strand and is the only adhesive in the reinforced sheet product.

---

This invention relates to nonwoven fabrics and particularly relates to tenchiques and apparatus for obtaining precise strand positioning with low adhesive content in the completed fabric.

This application is a division of the application of Hollis H. Bascom, Ser. No. 365,318 filed May 6, 1964 and now Patent No. 3,391,039. It relates to improvements in the invention disclosed in Patent 3,391,043 and involves subject matter related to that of Patent 3,463,693.

In a conventional process for the production of nonwoven fabrics a group of warp strands are moved longitudinally along a fixed support and are overlaid with a group of fill strands after adhesive has been applied to one or both sets of strands. Accurate positioning of each warp strand and each fill strand at the time the adhesive bond is being formed is quite important to produce the uniformity, flatness and other desired characteristics in the completed fabric.

One of the problems presented by such production of nonwoven fabrics is the deposit of adhesive from the warp and fill strands onto the support. The adhesive sticks to the support and, as it builds up, displaces the warp and cross strands and thus causes irregularities in the spacings of the various strands. It is a primary object of the present invention to prevent such deposit and build-up of adhesive on the support by interposing a moving sheet between the support and the warp and fill strands. The sheet, which can be paper, a reusable Teflon (polytetrafluoroethylene resin) plastic coated fiber glass belt or any other suitable material, moves in the same direction and at the same rate as the warp strands and prevents any build-up of adhesive. The sheet also helps to carry low thread count material.

In accordance with the present invention the warp strands are moved, under a controlled tension, about the cylindrical surface of a cylindrical support while the fill strands are wound about the warp strands. The fill strands are taken from thread packages mounted on a drum which is rotatable about the cylindrical support and the longitudinal moving warp strands. A magazine containing adhesive is also mounted on the rotatable drum and a metering tip extends radially inwardly from each magazine and into close proximity to the juncture of the fill strand and the warp strand. Precise longitudinal positioning of the tip is desirable. It is another object of the prenent invention to lock the tip to a rotatable ring which is maintained in a fixed longitudinal position with respect to the inlet end of the cylindrical support. This construction eliminates any longitudinal movement of the depending tip and significantly increases the accuracy and uniformity of the fill strand spacings.

It is another object to maintain a clean supply of adhesive for the strand to which the adhesive is applied. In accordance with the present invention this object is achieved by passing the fill strand through a tube provided with orifices at the inlet and outlet ends thereof and formed with a series of perforations adjacent one end thereof for straining out foreign matter while permitting a free flow of adhesive into the interior of the tube.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles.

In the drawings:

FIG. 6 is a fragmentary side elevation view showing details of a tip lock mounting for a fill strand magazine tip;

FIG. 7 is a fragmentary side elevation view showing details of the structure mounting the tip lock for rotation with the rotatable drum which carries the fill strand thread packages and adhesive magazines;

FIG. 8 is a side elevation view of the strainer tube shown in FIG. 5;

FIG. 9 is a cross sectional view showing details of the inlet diaphragm for the tube shown in FIG. 8;

Figure 1:
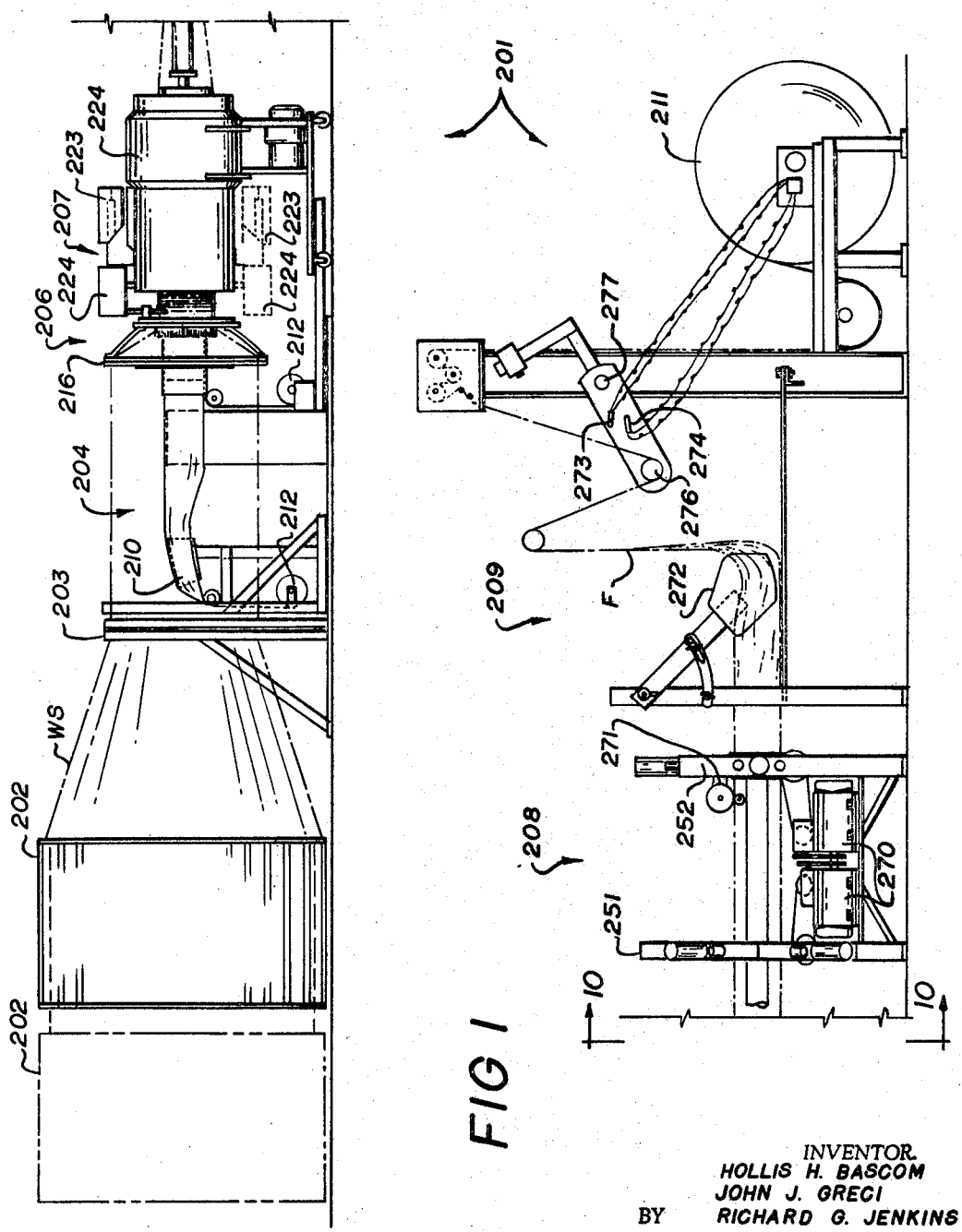
FIG. 1 is a side elevation view of apparatus for forming nonwoven fabric constructed in accordance with one embodiment of the present invention.

In FIG. 1 apparatus for forming nonwoven fabric constructed in accordance with one embodiment of the present invention is indicated generally by the reference numeral 201. Apparatus 201 is of the kind disclosed in detail in copending U.S. application Ser. No. 281,421, filed May 20, 1963 and assigned to the same assignee as the present invention. Reference is made to that application for details of the parts of the structure not described in detail hereinbelow.

Briefly, the apparatus 201 includes one or more creel and tension carts 202 for imparting a measured tension to warp strands 203, an eyeboard 203 for aligning the warp strands led from the creel and tension carts, means 204 for feeding one or more rolls of a sheet material between the warp strands WS and a fixed support, means 206 including a pair of reversely curved arcs and a reed guide described below for positioning the warp strands WS, fill strand feed means 207 for winding one or more adhesively coated fill strands about the warp strands to form a tubular web of fabric, a heater (not visible in FIG. 1) for heating the adhesive while the warp and fill strands are carried on the moving sheet, an octagonal drive 208 for drawing the warp strands and fabric through the apparatus 201, spreader means 209 for slitting the top of the tubular fabric and for opening the tubular web to a flat sheet, and a storage roller 211.

Precise strand positioning and constant and continuous support during the time that the adhesive is setting or being cured is most important in the production of nonwoven fabrics. Accurate and uniform positioning is important to realize a substantial part of the potential strand strength and to achieve the uniformity, flatness and handling characteristic possible with controlled strand placement and minimal amounts of adhesive.

One prior art technique which has been used in an attempt to achieve the desired precision in the strand positioning was to pass the warp strands over a fixed support while adhesively coated fill strands were pressed into engagement with the warp strands. However, some of the adhesive would drop onto the support, stick to the support and build up to displace the strands and thus cause irregularities in the spacings of the various strands.

In accordance with the present invention a moving sheet, which can be paper, a reusable Teflon plastic belt, or any other suitable material, is interposed between the adhesively coated strands and a support member. In this manner, whatever adhesive drops off the strand is picked up by the sheet. There can be no deposit and thus no build up of adhesive on the support member, and the moving sheet provides a continuous scavenging action. With low thread count materials, the sheet also helps to carry the material to provide further stabilization during the time that the adhesive is setting.

Figure 2:
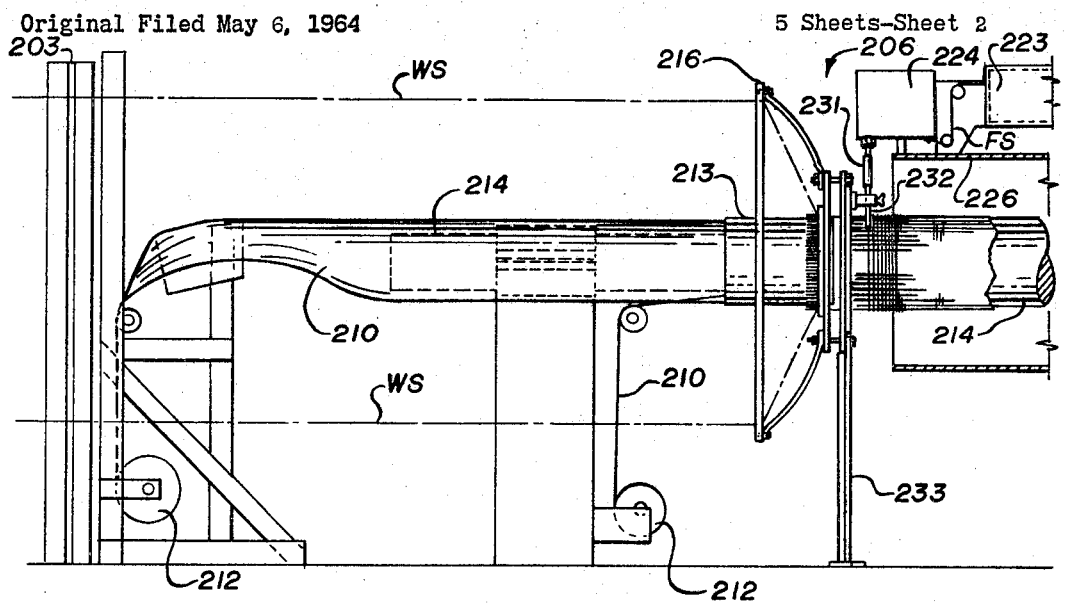
FIG. 2 is a side elevation view of the paper feed and strand positioning portions of the apparatus shown in FIG. 1 but drawn to a larger scale than FIG. 1 to show details of construction.

As best illustrated in FIG. 2, paper or other suitable material from one or more rolls 212 of paper or other suitable sheet material are fed onto and around a cylindrical support 214 and beneath a cylindrical paper guide 213 which is generally centrally disposed within the warp strands WS at the outlet end of the eyeboard 203. To start a new fabric the sheet and warp strands are drawn along the support by hand up to the drive 208. The drive 208 then pulls the warp strands and the sheet longitudinally over the support in a continuous process. In the apparatus shown in FIG. 2 the lowermost warp strands WS are maintained sufficiently spaced apart to permit the feeding of the sheets 210 into the center of the warp strands WS. In some cases it may be preferable to mount the paper rolls 212 entirely within the envelope formed by the warp strands WS.

Figure 3:
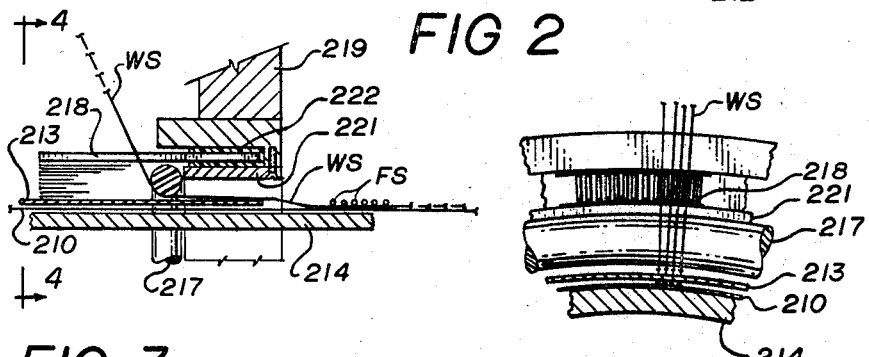
FIG. 3 is a fragmentary side elevation view showing details of the reed guide mounting for the warp strands.
Figure 4:
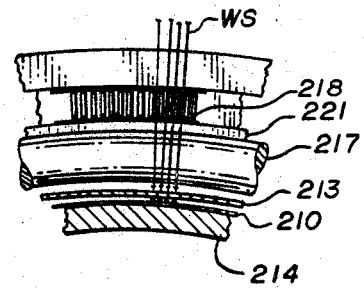
FIG. 4 is a fragmentary front elevation view of the reed guide arrangement shown in FIG. 3, but drawn to a slightly larger scale, taken along the line and in the direction indicated by the arrows 4—4 in FIG. 3.

With reference now to FIGS. 3 and 4, the sheet 210 is fed beneath the cylindrical paper guide 213 until just prior to the point of contact of the warp strands with the fill strand FS. Thus, the sheet 210 is made to conform to the surface of the support 214 free of wrinkles and other bulges for a substantial distance in front of the first strand junction contacts between the fill strands and warp strands.

Although not shown in FIG. 1, sheet take-up means similar to the sheet feed rolls 212 can be used at the outlet end of the octagonal drive 208 after the tubular web is slit and spread to a sheet form.

The warp strand positioning structure is similar to that disclosed in the above noted United States application Ser. No. 281,421, filed May 20, 1963, now Patent No. 3,391,043. Thus, the warp strand positioning means 206 includes a strand positioning plate 216 provided with individual porcelain eyelets for the individual warp strands and formed with bell shaped outlet ends which serve as one arc for permitting each warp strand to assume a stabilized position, as discussed further below. From the outlet end of the strand positioning plate 216 the warp strands pass under and through a ring 217. The ring 217 provides a second arc on its inner and forward surface which coacts with the outlet arcs of the eyelets in the strand positioning plate 216 to cause the tensioned warp strands to move to a stabilized position. The ring 217 is preferably formed of solid Teflon plastic. This material reduces abrasion of the warp strands to a minimum and prevents binder buildup.

In addition to the lateral positioning affored by the double arcs described above, each warp strand WS is provided with a pair of reed guides 218 (see FIGS. 3 and 4). The reed guides are maintained in circumferentially spaced alignment on a fixed support 219 by a retaining ring 221 which compresses gasket material 222 into firm contact with each individual reed 218.

Figure 5:
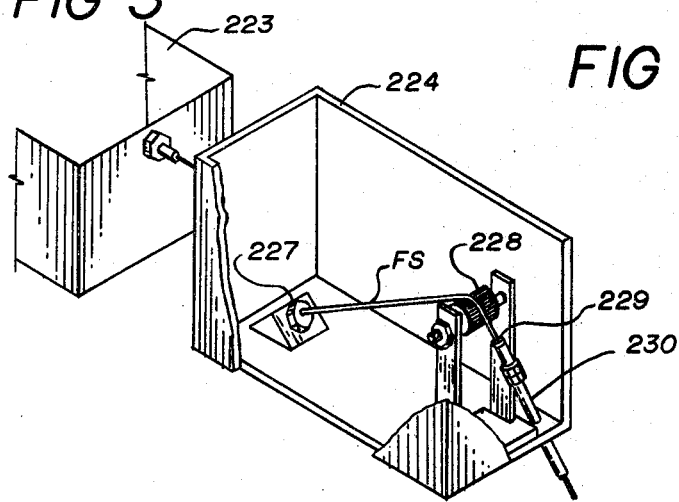
FIG. 5 is an isometric view of a fill strand adhesive magazine showing the location of a strainer tube.

With reference now to FIGS. 2, 6 and 7, a feature of the present invention for obtaining precise longitudinal and radial positioning of the point of contact of the fill strands with the warp strands will now be described. The individual fill strands FS are led from thread packages 223 and into an adhesive magazine 224, both of which are mounted on a rotatable drum 226. The adhesive magazine is partly broken away in the isometric view of FIG. 5 to show details of the interior of the magazine. The fill strand FS is led into the magazine throuhg an orifice 227 located on the radially inner side of the magazine. This orifice may preferably have a Teflon plastic diaphragm and prevents leakage of adhesive from the interior of the magazine 224 during the periods when the drum 226 is stationary and the magazine 224 is located in a position in which the orifice 227 would be below the fluid level of the adhesive. The fill strand passes over a knurled roller 223 and through a diaphragm 229 at the inlet end of a strainer tube 230, described in greater detail below, through a metering orifice 225 (FIG. 8) and through a flexible tube 231 to an adhesive positioning tip 232 which wipes adhesive from all the sides of the fill strand FS except that which is presented to the warp strands (as described in greater detail in the above noted U.S. application Ser. No. 281,421).

The outlet tube 231 and tip 232 depend for a considerable distance beneath the magazine 224. As a result, even with a rigid outlet tube assembly, it is difficult to maintain precise positioning of the end of the tip 232 as the drum 226 is rotated about the warp strands to wind the fill strands on the warp strands.

In accordance with the present invention the tip is locked in a fixed longitudinal and radial position by a connection to a fixed support frame 233 mounted rigidly on the floor. However, the tip 232 is free to rotate in a fixed longitudinal plane about the warp strands WS. The manner in which this is accomplished is best shown in FIGS. 6 and 7. As shown in FIG. 6, a ball bearing mount 234 comprising an outer race 236 and an inner race 237 is mounted in position on the fixed support structure 233 by a flange 238 and cap screws 239. The inner race 237 is free to rotate freely, on ball bearings 241, with respect to the outer race 236 and fixed support 233. A flange 242 provides a mount for a spacer block 243 of the desired width on the inner race 237. The tip 232 is then clamped in position on the spacer block 243 by a suitable clamp 244.

The inner race 237 is preferably driven directly from the drum 226 so that there will be no strain on the flexible tubes 231. This drive arrangement is shown in FIG. 7 where a radial strut 246 is attached at opposite ends to the drum 226 and the inner race 237.

The adhesive in the magazine 224 can accumulate a considerable amount of foreign matter during a production run. The present invention makes special provision for maintaining a clean supply of adhesive for application to the fill strands. In accordance with the present invention the tube 230, shown in FIG. 5 and shown in greater detail in FIGS. 8 and 9, is provided with inlet and outlet orifices 229 and 225 which regulate the amount of adhesive on the fill strand FS. These orifices preferably include Teflon plastic diaphragms 247 as illustrated in FIG. 9. The opening in the Teflon plastic diaphragm will readily deform to permit a knot K in the fill strand to pass through the diaphragm without imposing a stress on the fill strand which would break the fill strand. One end of the tube 230 is formed with a series of perforations 248. These perforations are small enough to strain out foreign particles which could clog the metering orifice 225. However, the orifices permit free flow of clean adhesive into the interior of the tube 230. Thus, the orifices 248 in the tube 230 act to strain out foreign particles and permit clean adhesive to be admitted into the interior of the tube so that the orifice 225 can at all times perform a precise metering function.

Coils or other suitable heating means are disposed within the interior of the cylindrical support 214 for heating and curing the adhesive during the time that the tubular fabric is transported on the sheet 210 along the surface of the support 214. Such heating means are not shown in the drawings of this application and reference is made to the above noted copending U.S. application Ser. No. 281,421 for a description of such heating means.

The drive means 208 comprise a first set of friction drive rollers 251 and a second set of friction drive rollers 252. Each of the sets of friction drive rollers comprises four outside rollers 253 mounted on shafts 254 juornalled for rotation within yokes 256. The yokes 256 are each in turn positionable in a radial direction by piston rod 257 of a fluid actuated motor 258 mounted on the rectangular frame.

Energization of the motor 258 biases the yoke 256 radially inwardly to engage the sheet 210 and tubular fabric F between the roller 253 and a corresponding inner roller 261 mounted in a fixed radial and axial position within a frame 262. A pair of guide rods 263, which are slidable within a sleeve 264, maintain alignment of the yoke 256 during inward and outward movement. Rods 266 and adjustable stop nuts 267 provide limiting means for limiting the inward movement of each yoke 256. Such limiting means enable the outside rollers to be returned to an identical position after any outward movement of the rollers for any reason. The rollers 253 are driven by a drive shaft 268 connected to electric motors 270 (see FIG. 1) and bevel gears 269 at the ends of the shafts 254.

Figure 10:
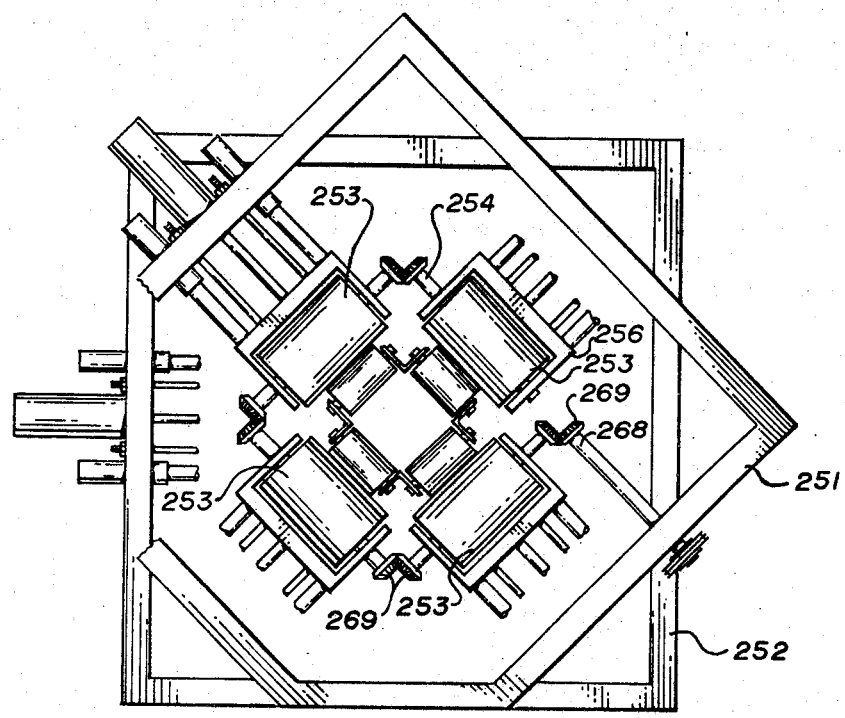
FIG. 10 is a front elevation view of the octagonal drive taken along the line and in the direction indicated by the arrows 10—10 in FIG. 1.
Figure 11:
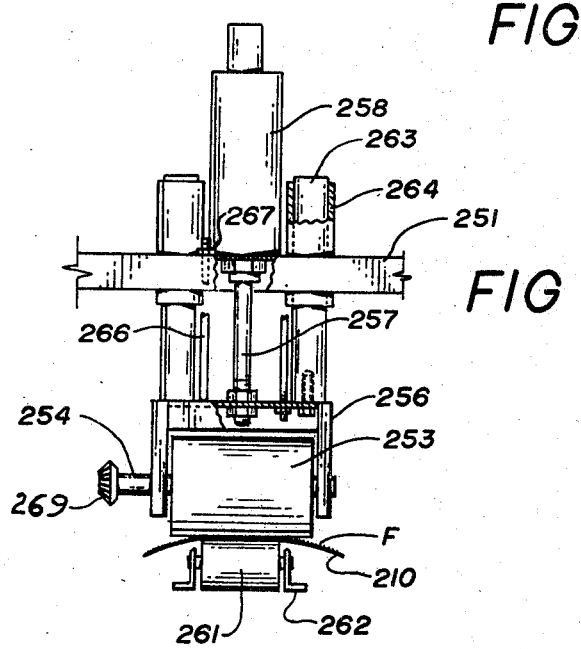
FIG. 11 is a front elevation view, partly broken away to show details of construction, of the roller mounting for the rollers shown in FIG. 10.

The frame for the first set of drive rollers is canted at an angle of forty-five degrees with the frame for the second set of drive rollers 252 so that two sets of drive rollers provide an octagonal drive which approaches a uniform drive about the entire circumferential extent of the tubular fabric. This is best shown in FIG. 10.

The motor 270 for the drive rollers 252 is suitably controlled to act as the lead motor while the motor 270 for the forward set of drive rollers 251 follows the drive for the second set of drive rollers or motors may be tied together.

To conserve space it is desirable to convert the tubular fabric F to a flat sheet in a relatively short longitudinal distance, and this is accomplished in the apparatus shown in FIG. 1 by the means indicated generally by reference numeral 209. A rotating roller 271 mounts a knife edge which continuously slits the upper side of tubular fabric F at the inlet end of the second set of drive rollers 252.

To avoid imposing strains on the fabric which could distort the recently set bonds between the fill and warp strands, it is important that the tube be opened to a flat sheet in a relaxed form. As illustrated in FIG. 1 an expander 272 is mounted to open the tubular fabric to a flat sheet F at the same time the sheet is turned ninety degrees from a horizontal to a vertical direction. The fabric F is passed over and under a series of rollers before finally being wound onto a storage roll 211. The storage roll is driven by an electric motor under the control of two mercury level switches 273 and 274. The switches 273 and 274 sense the level of a dancer roll 276 which indicates the amount of tension in the fabric. Normally, the switch 273 will be made to drive the storage roll, through a rheostat control, at a selected take-up speed. However, if this take-up speed should be too fast, the dancer roll will be pulled upwardly about a pivotal mounting 277 to energize level switch 274 which causes the storage roll 211 to be driven at a slower speed, through a second rheostat, until the fabric tension again decreases to the point where the storage roll 211 is driven by energization of switch 273. Thus, the storage roll 211 is driven at a speed fast enough to prevent any undue slack in the fabric, yet excessive tension which could cause distortion is at all times prevented.

While the tension control has been shown as provided by a pivotally mounted dancer roller 276, the sensor switches 273 and 274 can equally well be attached to the spreader 272 and the spreader 272 can be mounted for free pivoting movement about its support to provide the tension control provided by the dancer roller described above.

Figure 14:
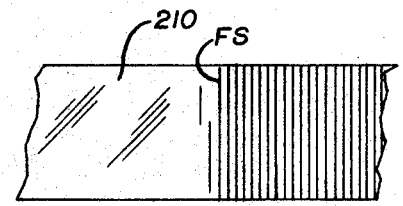
FIG. 14 is a plan view of another product constructed in accordance with the present invention.

In accordance with the present invention the sheet 210 can serve as a removable backing for the fabric F as described above. However, the sheet 210 can also be incorporated directly into the final product. There are many applications where reinforced sheet material is beneficial. The present invention is especially adapted to provide a product of this sort. Thus, paper, plastic or any other sheet material can be reinforced, either in tube form or flat sheet form, with a uniformly spaced thread reinforcement having a minimum of adhesive. FIG. 14 illustrates a product of this sort in which the sheet 210 has been overlaid with fill strands FS. In this case the product was made by omitting the usual warp strands WS and using the sheet 210 as a sheet warp for the fill strands FS.

Figure 12:
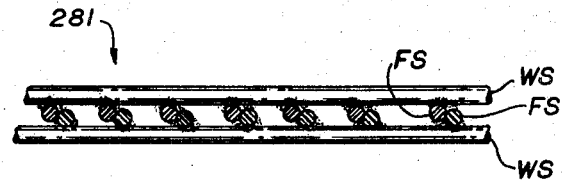
FIG. 12 is a side elevation view of a product constructed in accordance with one embodiment of the present invention.
Figure 13:
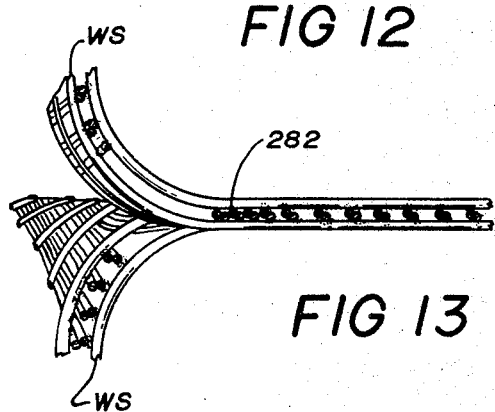
FIG. 13 is a side elevation view showing the disposition assumed by the strands of the product shown in FIG. 12 when the FIG. 12 product is subjected to a standard tear test.
Figure 15:
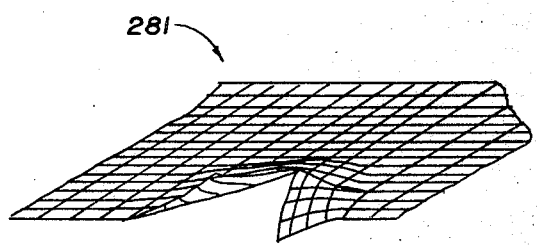
FIG. 15 is an isometric view of the tear test of the product shown in FIG. 13.

Another new product produced in accordance with the present invention is illustrated in FIGS. 12, 13 and 15. The fabric 281 illustrated in these figures is made by arranging two separate fabrics, having warp strands WS and fill strands FS, face to face with the fill strands of one fabric extending parallel to and in engagement with the fill strands of the other fabric. The fill strands are then adhesively bonded together. This arrangement of fibers provides greatly increased tear resistance and also provides a fabric which is well adapted for reinforcements in rubber sheets.

In the standard tear tests, the fabric is partially cut across the fill strands and parallel to the warp strands. When the divided portions of the fabric are then pulled in opposite directions in the manner shown in FIGS. 13 and 15, the force applied will tend to break some of the bonds in the area of the fabric local to the end of the cut. This causes a bunching of the fill strand fibers as indicated generally by the reference numeral 282 in FIG. 13 so that the individual strengths of each fiber are added together in a cumulative manner. Further tearing of the fabric is thus dependent on the cumulative strength of the fibers so bunched. The force required to continue to tear this fabric is greatly increased as compared to the force necessary to break a single fiber or to delaminate a single strand. To tear the fabric illustrated in FIGS. 12 and 13 it is in effect necessary to pull the lower warp strands WS completely through the entire fabric.

The orientation of the warp strands in parallel relation on the outside surfaces of the fabric 281 also gives a smooth surface which minimizes pick-off of threads during the frictioning process when rubber is added to the fabric.

What is claimed is:

1. A nonwoven fabric comprising two outer layers of warp strands each adhesively bonded to an adjacent one of two inner layers of fill strands and having the two inner layers of fill strands adhesively bonded together with each fill strand in each layer extending parallel to the fill strand in the opposite layer to which it is bonded and wherein the warp strands are free of adhesive except for the areas of attachment to the fill strands.

2. A laminated nonwoven strand reinforced product comprising as a first lamina, a sheet having an indeterminate length in a major direction and a determinate width in a minor direction transverse to said major direction,
as a second lamina a plurality of uniformly oriented, laterally spaced and parallel disposed fill strands extending across said sheet in said minor direction, a thin film of adhesive extending on the inner side of each fill strand and bonding the fill strand to the sheet material, said sheet material being free of adhesive except for the areas of engagement by the fill strands.

3. A product as defined in claim 2 including a third lamina comprising a plurality of parallel spaced, uniformly tensioned and precisely oriented warp strands of uniform length extending in said major direction and disposed between said first and second lamina to form areas of engagement with the fill strands where the fill strands overlap the warp strands and wherein the thin film of adhesive on the innerside of the fill strand connects the fill strand to the warp strand in said areas of overlapping engagement, said warp strands being free of adhesive contact with said sheet material and being held in position on the sheet material under the fill strands without any adhesive except for the thin film on the inner side of said fill strand which adheres the fill strands to the warp strands and sheet material.

References Cited

UNITED STATES PATENTS

| 3,084,089 | 4/1963 | Morgan et al. | 161—143 XR |
| 3,250,655 | 5/1966 | Adler | 156—181 |
| 2,919,217 | 12/1959 | Bobkowicz | 161—143 XR |
| 3,193,436 | 7/1965 | Kalwaites | 161—143 XR |
| 3,000,432 | 9/1961 | Olken | 156—441 XR |
| 2,985,220 | 5/1961 | Fry | 156—433 XR |

FOREIGN PATENTS 543,091  7/1957  Canada.

PHILIP DIER, Primary Examiner

U.S. Cl. X.R.

156—178, 181; 161—143, 157